United States Patent [19]

Lii

[11] Patent Number: 5,226,467
[45] Date of Patent: Jul. 13, 1993

[54] WIND-SHIELD BLIND SYSTEM

[76] Inventor: Jong-Yi Lii, No. 17, Alley 160, Lane 164, Jong-Shan North Road, Yung-Kang Shiang, Tainan Shien, Taiwan

[21] Appl. No.: 898,153

[22] Filed: Jun. 15, 1992

[51] Int. Cl.⁵ .............................................. E06B 9/56
[52] U.S. Cl. ...................................... 160/302; 160/305; 160/370.2
[58] Field of Search ...................... 160/23.1, 294, 301, 160/302, 305, 313, 323.1, 370.2, 304.1; 296/37.16, 95.1, 97.7, 97.8

[56] References Cited

U.S. PATENT DOCUMENTS

| | | | |
|---|---|---|---|
| 1,621,972 | 3/1927 | Darby | 160/23.1 |
| 2,561,188 | 7/1951 | Ferguson | 160/23.1 |
| 2,589,609 | 3/1952 | Foster | 160/23.1 |
| 4,335,773 | 6/1982 | Masi | 160/23.1 |
| 4,707,018 | 11/1987 | Gavagan | 160/23.1 X |
| 4,762,358 | 8/1988 | Levosky et al. | 160/323.1 X |
| 4,823,859 | 4/1989 | Park | 160/23.1 X |
| 4,869,542 | 9/1989 | Lin | 160/370.2 X |
| 5,036,898 | 8/1991 | Chen | 160/23.1 |
| 5,054,533 | 10/1991 | Lii | 160/370.2 |

Primary Examiner—David M. Purol

[57] ABSTRACT

A wind-shield blind system to thermally insulate the windshield of a car. The system includes a spindle tube with a spindle tube mechanism which allows the blind to extend only, preventing the blind from being accidentally rewound by locking the spindle tube in a stationary position at any of a plurality of positions in its range of extension. The spindle tube mechanism includes a push block which, when activated, causes the blind to be automatically rewound.

1 Claim, 3 Drawing Sheets

WIND-SHIELD BLIND SYSTEM

BACKGROUND OF THE INVENTION

A wind-shield blind system patented by U.S. Pat. No. 5,054,533 comprises a roller blind carried by a roller blind mechanism having a ratcheting mechanism which allows the roller blind to extend only and prevents it from being accidentally rewound so as to lock the roller blind stationary with respect to the roller at any of a plurality of positions along its extension. The roller blind mechanism can be released from the effect of the ratcheting mechanism by pressing a control stem to automatically rewind the roller blind.

But it has been found to have a disadvantage that the rotation of the roller is quite unstable, allowing the roller to rotate unexpectedly when it is in locked position.

SUMMARY OF THE INVENTION

This invention has been devised to improve the above-mentioned U.S. Pat. No. 5,054,533, aiming to make the roller blind rotate stably and to get rid of irregular rotation.

The main feature in the present invention is to provide a second (right-side) plug formed with a toothed rim and a rod extending outward, and a second end cap formed with a central passage for the rod in the second plug to extend through, a toothed rim to engage or disengage from the toothed rim in the second plug, a cavity and an oval opening communicating with the cavity in the outer portion for a push block to fit therein. The push block has an inner side formed with a central groove, an upper recess and a lower recess to selectively engage with the end tip of the rod in the second plug, when the push block fitted in the cavity and the oval opening in the second end cap is manually pushed up or down from an intermediate position wherein the rod end tip engages the central groove which is deeper than the the upper or the lower recess to an upper or a lower position wherein the rod end tip is moved inward to engage the upper or the lower recess. Consequently, the second plug is also moved inward, freeing the toothed rim thereof from a toothed rim in the second end cap so that the spindle tube unrotatably combined with the second plug can rewind the blind back.

DETAILED DESCRIPTION OF THE INVENTION

Figure 1:
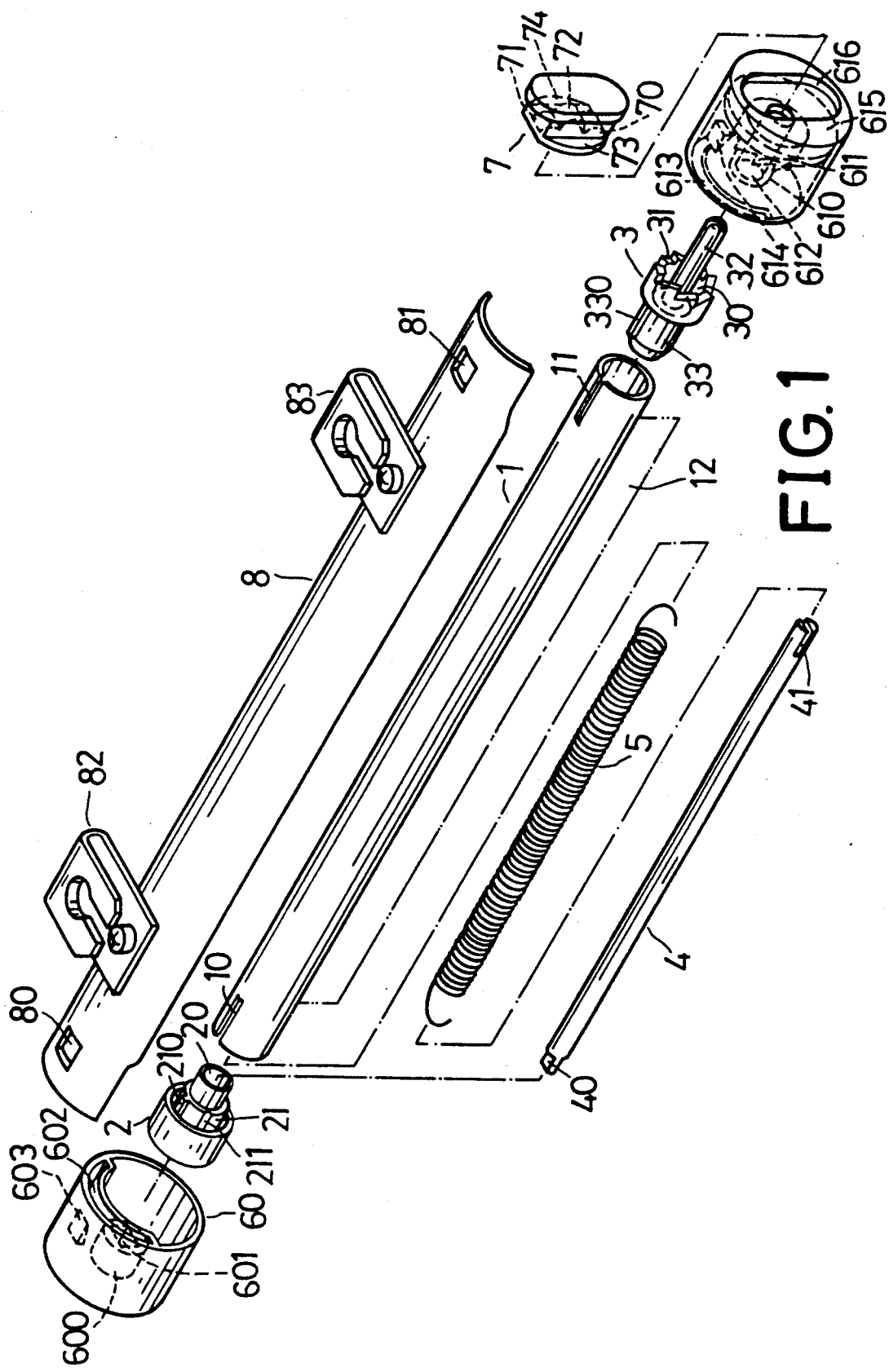
FIG. 1 is an exploded perspective view of the wind-shield blind system in the present invention.
Figure 2:
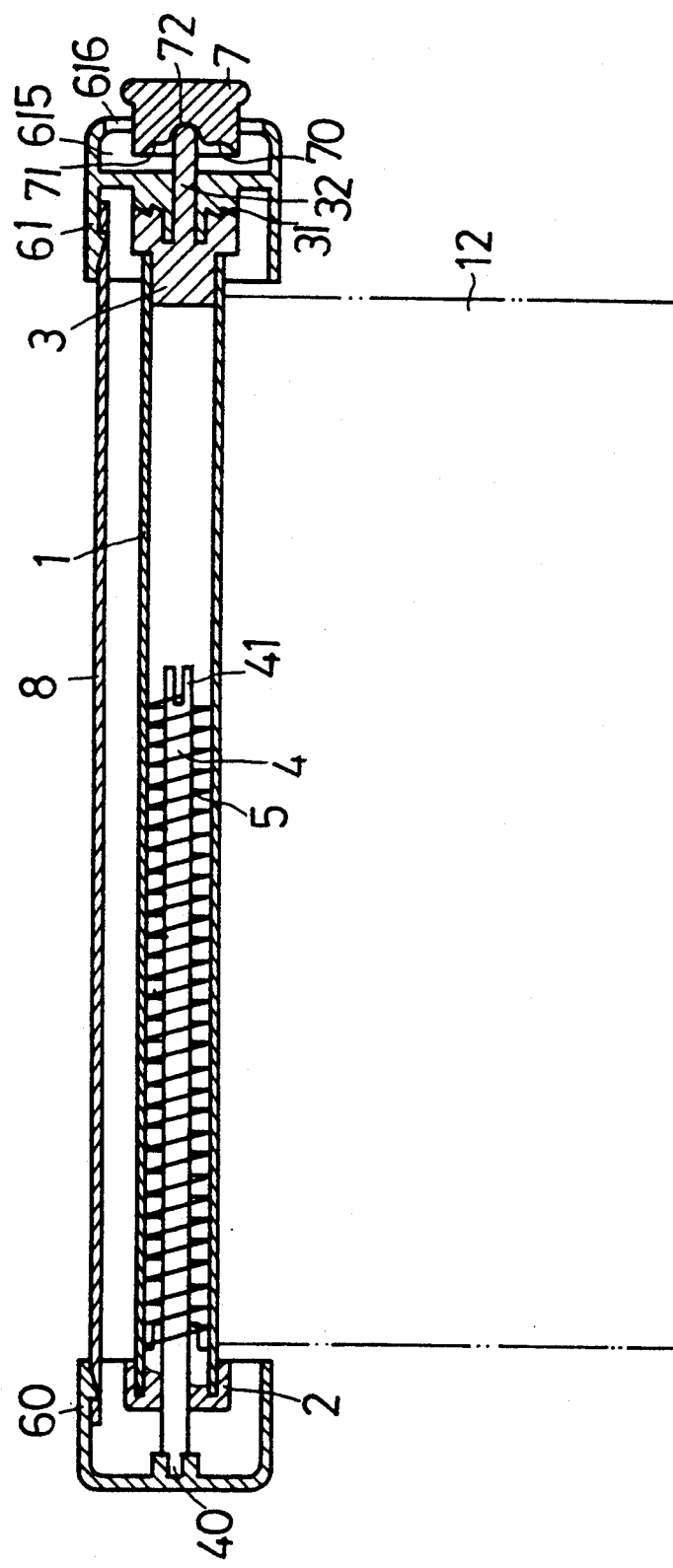
FIG. 2 is a cross-sectional view of the wind-shield blind system in the present invention.

The wind-shield blind system in the present invention, as shown in FIGS. 1 and 2, comprises a tube 1, two plugs 2, 3, an elongated rod 4, a long coil spring 5, two end caps 60, 61, a push block 7 and a curved cap 8 as its main components.

The tube 1 functions as a spindle for carrying an opaque plastic film 12 and being formed with slits 10, 11 in its opposite ends, and the plastic film 12 is fixed between both slits 10, 11.

The two plugs 2, 3 are plugged in the opposite ends of the tube 1 and prevented from rotating relative to the tube 1 by ribs ribs 210, 330 respectively engaged in the slits 10, 11. The first (left-side) plug 2 has a central longitudinal bore 20, a tubular post 21 defining the central bore 20, a rib 210 on an outer surface of the tubular post 21 to engage the slit 10, a groove 211 in the outer surface of the tubular post 21. The second plug 3 has a central bore 30, a toothed rim 31 around the bore 30, a short rod 32 extending outward through the bore 30, a post 33 extending to the left, a rib 330 on an outer surface of the post 33 to engage the slit 11 in the tube 1.

The elongated rod 4 is fixed to extend through the interior of the tube 1, having a flattened section 40 at one end passing through the bore 20 in the first plug 2 and a slit 41 in the other end.

The long coil spring 5 is disposed around the elongated rod 4, one end being fixed to the slit 41 of the rod 4 and the other end being fixed in the groove 211 in the first plug 2.

The end caps 60, 61 are respectively fixed to close the left and the right end of the tube 1. The first end cap 60 is formed with a round spigot 600 extending upright on an inner bottom, an aperture 601 in the spigot 600, a curved recess 602 along an inner circumferential wall and a fitting block 603 on its surface. The second end cap 61 is formed with a round tube 610 extending upright on an inner bottom, a toothed rim 611 around the tube 610 to engage the toothed rim 31 in the second plug 3, a central longitudinal bore 612 in the tube 610, a curved recess 613 and a fitting block 614 on the left inner wall, a cavity 615 and an oval opening 616 in the right end.

The push block 7 is to be fitted in the oval opening 616 in and the cavity 615 of the second end cap 61, having an upper recess 71, a lower recess 70 and a central groove 72 in a left vertical side, two projecting curved walls 73, 74 on a front and a rear portion of the left side.

The curved cap 8 is mounted lengthwise on the tube 1, having two opposite ends respectively inserted into corresponding receses 602, 613 defined in the first and second end caps 60, 61, and formed with two holes 80, 81 engaging the fitting blocks 603, 614 in the two end caps 60. 61 and respectively inserted into corresponding recesses 602, 613 defined in the first and second end caps 60, 61, and two bracket assemblies 82, 83 properly spaced apart on both end portions.

In assembling this wind-shield blind system, at first, the coil spring 5 is disposed around the elongated rod 4, and the two ends of the spring 5 are respectively hooked with the slit 41 in the right end of the rod 4 and the groove 211 in the first end cap 2. Then the rod 4 is pushed with the flattened section 40 going through the central longitudinal bore 20 in the first end cap 2 to fit and be stabilized in the groove 601 in the second end cap 60. Then the tube 1 is disposed around the elongated rod 4 together with the spring 5 and the two ribs 210, 330 being made to engage the slits 10, 11 respectively. Next, the curved cap 8 is assembled with the first end cap 60, with its end fitting in the curved recess 602 in the first end cap 60 and with the hole 80 engaging the fitting block 603 in the first end cap 6. After that, the second end cap 61 is assembled with the second plug 3 and the curved cap 8, by letting the toothed rim 611 engage with the toothed rim 31 in the second plug 3 and the short rod 32 passing through the central longitudinal bore 612 in the second end cap 61, and letting the hole 81 engage the fitting block 614. Lastly, the push block 7 is fitted in the oval opening 616 and the cavity 615 in the second end cap 61, letting curved walls 73, 74 insert in the cavity 615 and the short rod 32 in the second plug 3 insert in the groove 72. Then the oval opening 616 has a hollow space left respectively in the upper and in the lower portion so that the push block 7 can be pushed up or down in the oval opening 616, with the upper and the lower recess 70, 71 in the push block 7 pushing the short rod 32 to the left. Now this system is finished in its assemblage.

In operation, the toothed rim 31 in the second plug 3 and the toothed rim 611 in the second end cap 61 function as a ratchet device, allowing the plastic film 12 to extend only and preventing it from being rewound to lock the plastic film 12 stationary with respect to the tube 1 at any of a plurality of positions along its its extension, as shown in FIG. 2.

In using this blind system, the plastic film 12 is to be pulled down, forcing the tube 1 to rotate clockwise, and then the second plug 3 is also rotated by means of the rib 330 engaging the slit 11. The toothed rim 31 in the second plug 3 slides over the toothed rim 611 in the second end cap 61 and the coil spring 5 becomes compressed. When the plastic film 12 is pulled out to a needed length, it is to be released manually, then the coil spring 5 compressed will elastically push the tube 1 to rotate counterclockwise, but the tube 1 cannot do so, stopped by the ratchet teeth in the toothed rim 611 on the second end cap 61 engaging and stopping the ratchet teeth in the toothed rim 31 in the second plug 3, keeping the film 12 at the pulled-out length.

Figure 3:
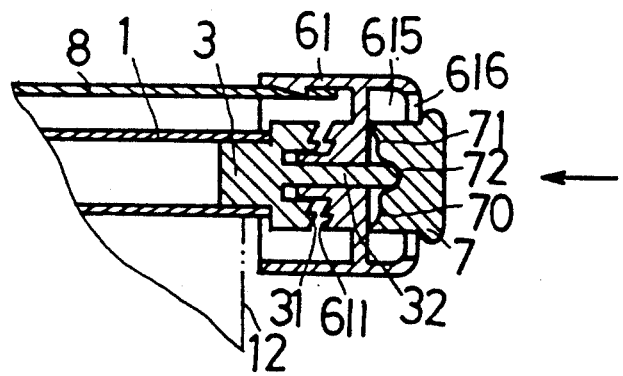
FIG. 3 is a cross-sectional view of a push block pushed down in the wind-shield blind system in the present invention.
Figure 4:
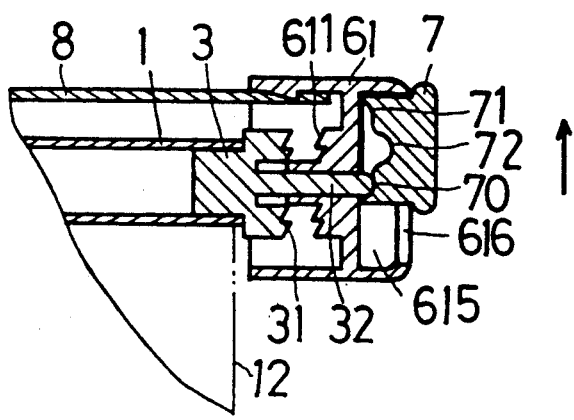
FIG. 4 is a cross-sectional view of the push block pushed up (or down) in the wind-shield blind system in the present invention.
Figure 5:
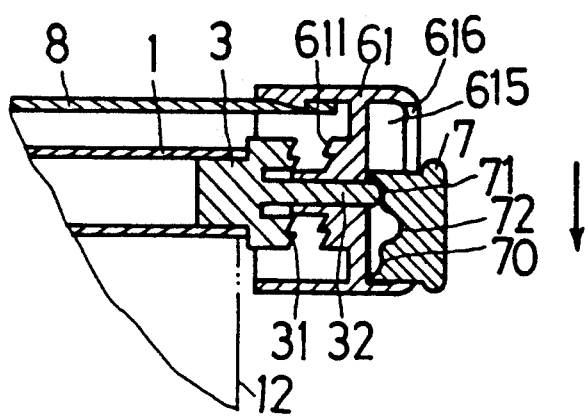

In rewinding the plastic film 12 back to the spindle tube 1, the push block 7 is to be lifted up or lowered down manually, as shown in FIGS. 3 and 4. Then the short rod 32 in the second plug 3 has its end tip pushed inward by the upper recess 71 or the lower recess 70 in the push block 7, as the groove 72 is deeper than the upper or the lower recess 71, 70. Consequently, the second plug 3 is to be pushed inward together with the rod 32, forcing the toothed rim 31 separate from the toothed rim 611 in the second end cap 61, and letting the spindle tube 1 rotate counterclockwise together with the second plug 3 to rewind the film 12 back on the tube 1. After that, the push block 7 is to be pushed to the intermediate position to let the second plug 3 to move back, with the rod 32 engaging the central groove 72, enabling the spindle tube 1 ready for winding the film 12 out.

What is claimed is:

1. A car windshield blind system comprising:
   a spindle tube including means to secure one end of an opaque plastic blind, the blind when retracted being wrapped around the spindle tube;
   two end plugs, one fixed in each end of the spindle tube, with a first end plug being formed with a central passageway extending axially therethrough, and with a second end plug including a toothed rim at an outer edge of the perimeter of the second end plug, the second end plug also including a short rod which extends from the center of the second end plug;
   an elongated rod having a first end which passes through the first end plug and which includes a flattened section, and a second end of the elongated rod including a slot;
   a helical spring disposed around the rod, one end of the spring being affixed to the first end plug and a second end of the spring being fixed in the slot in the second end of the elongated rod such that when the opaque blind is extended, the spring exerts a constant tension urging the rod and spindle tube to rotate in a direction so as to retract the opaque blind;
   two end caps, one situated at each end of the spindle tube and surrounding the end plugs in a manner that allows the end plugs of the spindle tube to rotate therein, a first end cap including a receptacle on the interior of a base for receiving the flattened section of the first end of the elongated rod such that the rod cannot rotate, and a second end cap formed with a toothed rim on an inner side adjacent to and meshing in a releasable manner with the toothed rim of the second end plug, the teeth on the rims being angled such that when the rims are meshed, rotation of the spindle tube is possible in one direction only, that direction of rotation being that which allows the opaque blind to extend, and the second end cap further including an aperture in its center through which the short rod of the second end plug passes, the short rod fitting into a receptacle in a push button which is inserted into an oval opening in the outer surface of the second end cap;
   a semi-circular capping member which fits into recesses provided at the top of the end caps and is fixed in place circumferentially by stop blocks provided in the end caps which lock into holes in the capping member, the capping member including mounting means affixed thereto;
   operation of the device being accomplished by a user pulling on a free end of the opaque blind, the force of such pulling overcoming the tension provided by the spring and causing the meshed toothed rims to partially disengage so that the opaque blind extends, such extension being possible only so long as the user applies pulling force,
   and upon release of the pulling force the spring tension causes the toothed rims to re-engage, holding the opaque blind in place,
   retraction of the blind being accomplished by depressing the push button in the second end cap, thus applying pressure to the end of the short rod and moving the second end plug away from the second end cap, thus causing the meshed rims to disengage, allowing the tension of the spring to rewind the opaque blind around the spindle tube.

* * * * *